United States Patent
Clark et al.

(10) Patent No.: US 10,577,944 B2
(45) Date of Patent: Mar. 3, 2020

(54) ENGINE COMPONENT WITH HOLLOW TURBULATORS

(71) Applicant: General Electric Company, Schenectady, NY (US)

(72) Inventors: Emily Rosette Clark, Cincinnati, OH (US); James Richard Winka, Princeton, NJ (US); Daniel Robinson Getsinger, Los Angeles, CA (US); Thomas Earl Dyson, Niskayuna, NY (US); Brian Gene Brzek, Clifton Park, NY (US); James Fredric Wiedenhoefer, Clifton Park, NY (US); William Robb Stewart, Boston, MA (US)

(73) Assignee: General Electric Company, Schenectady, NY (US)

( * ) Notice: Subject to any disclaimer, the term of this patent is extended or adjusted under 35 U.S.C. 154(b) by 261 days.

(21) Appl. No.: 15/667,765

(22) Filed: Aug. 3, 2017

(65) Prior Publication Data

US 2019/0040745 A1 Feb. 7, 2019

(51) Int. Cl.
*F01D 5/18* (2006.01)
*F01D 25/24* (2006.01)
(Continued)

(52) U.S. Cl.
CPC ............ *F01D 5/186* (2013.01); *F01D 5/187* (2013.01); *F01D 9/065* (2013.01); *F01D 25/14* (2013.01); *F01D 25/24* (2013.01); *F23R 3/002* (2013.01); *F23R 3/005* (2013.01); *F23R 3/06* (2013.01); *F05D 2240/11* (2013.01); *F05D 2240/303* (2013.01); *F05D 2240/304* (2013.01); *F05D 2250/314* (2013.01); *F05D 2250/75* (2013.01);
(Continued)

(58) Field of Classification Search
CPC .......... F01D 5/186; F01D 5/187; F01D 25/14; F01D 25/24; F01D 9/065; F01D 5/18; F23R 3/002; F23R 3/005; F23R 3/06; F23R 2900/03041; F23R 2900/03045; F05D 2240/11; F05D 2240/606; F05D 2240/604; F05D 2250/75; F05D 2250/314; F05D 2260/202; F05D 2260/204; F05D 2260/205; F05D 2260/2212; F05D 2260/2214
See application file for complete search history.

(56) References Cited

U.S. PATENT DOCUMENTS 2,919,549 A * 1/1960 Haworth .................. F02K 1/822
                                                    415/217.1
5,197,852 A    3/1993 Walker et al.
(Continued)

FOREIGN PATENT DOCUMENTS

EP            1111190 A1    6/2001

*Primary Examiner* — Justin D Seabe
*Assistant Examiner* — Joshua R Beebe
(74) *Attorney, Agent, or Firm* — McGarry Bair PC

(57) ABSTRACT

An apparatus and method for cooling an engine component, such as an airfoil, for a turbine engine including an outer wall separating a cooling fluid flow from a hot fluid flow. A cooling circuit including a cooling passage having opposing sidewalls can be provided in the engine component. At least one turbulator can be provided between the opposing sidewalls, and can include a conduit having an inlet and an outlet passing through the at least one turbulator.

28 Claims, 9 Drawing Sheets

(51) Int. Cl.
*F01D 9/06* (2006.01)
*F23R 3/00* (2006.01)
*F23R 3/06* (2006.01)
*F01D 25/14* (2006.01)

(52) U.S. Cl.
CPC .. *F05D 2260/202* (2013.01); *F05D 2260/204* (2013.01); *F05D 2260/205* (2013.01); *F05D 2260/2212* (2013.01); *F05D 2260/2214* (2013.01); *F23R 2900/03041* (2013.01); *F23R 2900/03045* (2013.01)

(56) References Cited

U.S. PATENT DOCUMENTS

| | | | |
|---|---|---|---|
| 5,246,340 A | 9/1993 | Winstanley et al. | |
| 5,370,499 A | 12/1994 | Lee | |
| 5,624,231 A * | 4/1997 | Ohtomo | F01D 5/186 415/115 |
| 5,700,132 A | 12/1997 | Lampes et al. | |
| 5,797,726 A | 8/1998 | Lee | |
| 6,000,908 A * | 12/1999 | Bunker | F01D 5/189 165/908 |
| 6,213,714 B1 * | 4/2001 | Rhodes | F01D 5/186 416/96 R |
| 6,974,308 B2 | 12/2005 | Halfmann et al. | |
| 7,347,671 B2 | 3/2008 | Dorling et al. | |
| 8,668,453 B2 * | 3/2014 | Lee | F01D 5/187 416/96 R |
| 8,690,538 B2 | 4/2014 | Levine et al. | |
| 9,366,143 B2 * | 6/2016 | Lee | F01D 5/186 |
| 10,053,988 B2 * | 8/2018 | Itzel | B33Y 10/00 |
| 2005/0106021 A1 * | 5/2005 | Bunker | F01D 5/187 416/97 R |
| 2007/0297916 A1 | 12/2007 | Levine et al. | |
| 2012/0201653 A1 | 8/2012 | Moga et al. | |
| 2015/0300257 A1 * | 10/2015 | Vandervaart | F01D 5/182 415/116 |
| 2016/0059437 A1 | 3/2016 | Lacy et al. | |
| 2016/0208705 A1 * | 7/2016 | Slavens | F01D 5/187 |
| 2016/0333702 A1 * | 11/2016 | Slavens | F01D 5/187 |
| 2017/0314398 A1 * | 11/2017 | Slavens | F01D 5/187 |

* cited by examiner

ENGINE COMPONENT WITH HOLLOW TURBULATORS

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

In one aspect, the present disclosure relates to an airfoil for a turbine engine including an outer wall defining a pressure side and a suction side extending axially between a leading edge and a trailing edge defining a chord-wise direction and extending radially between a root and a tip defining a span-wise direction. A cooling circuit is located within the airfoil and comprising at least one cooling passage with at least one of the at least one cooling passage including a first sidewall and a second sidewall. At least one turbulator is provided in the at least one cooling passage extending between the first sidewall and the second sidewall. At least one conduit has an inlet and an outlet, fluidly couples to the cooling circuit, and at least partially passes through the at least one turbulator.

In another aspect, the present disclosure relates to a component for a turbine engine including an outer wall separating a cooling airflow from a hot airflow having a first surface facing the cooling airflow and a second surface facing the hot airflow. A cooling circuit is at least partially defined by the outer wall and includes at least one cooling passage with one of the at least one cooling passages having a first sidewall and a second sidewall. At least one pin is provided in the cooling passage and extends between the first and second sidewalls. At least one conduit is in fluid communication with the cooling circuit and has an inlet and an outlet, and at least partially passes through the at least one pin.

In yet another aspect, the present disclosure relates to a method of cooling an engine component including redirecting a portion of a cooling fluid passing through a cooling passage within the engine component through the interior of a turbulator spanning the cooling passage.

DETAILED DESCRIPTION OF THE INVENTION

Figure 1:
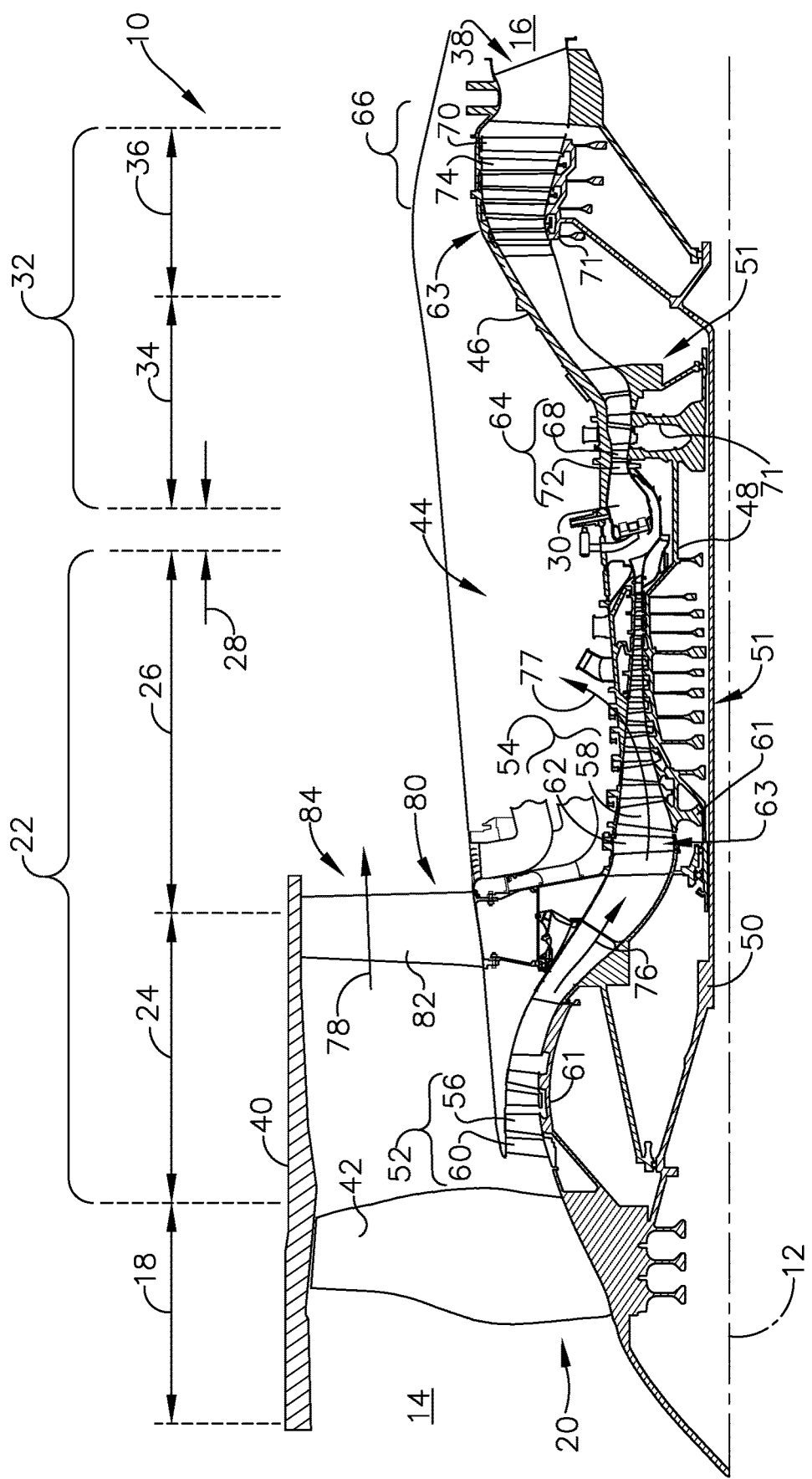
FIG. 1 is a schematic cross-sectional diagram of a gas turbine engine for an aircraft.

Aspects of the disclosure described herein are directed to a conduit provided through one or more turbulators, illustrated as an exemplary pin, chevron pin, or pins in a pin bank, as well as a hollow pin for a pin bank. For purposes of illustration, the present disclosure will be described with respect to a blade for a gas turbine engine for an aircraft. It will be understood, however, that aspects of the disclosure described herein are not so limited and may have general applicability within other components of such an engine, including but not limited to vanes, nozzles, struts, or shrouds, and can include any suitable type of turbine engine, as well as non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, an engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor mount to a disk 61, which mounts to the corresponding one of the HP and LP spools 48, 50, with each stage having its own disk 61. The vanes 60, 62 for a stage of the compressor mount to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can mount to a disk 71, which is mounts to the corresponding one of the HP and LP spools 48, 50, with each stage having a dedicated disk 71. The vanes 72, 74 for a stage of the compressor can mount to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 splits such that a portion of the airflow is channeled into the LP compressor 24, which then supplies pressurized air 76 to the HP compressor 26, which further pressurizes the air. The pressurized air 76 from the HP compressor 26 mixes with fuel in the combustor 30 where the fuel combusts, thereby generating combustion gases. The HP turbine 34 extracts some work from these gases, which drives the HP compressor 26. The HP turbine 34 discharges the combustion gases into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
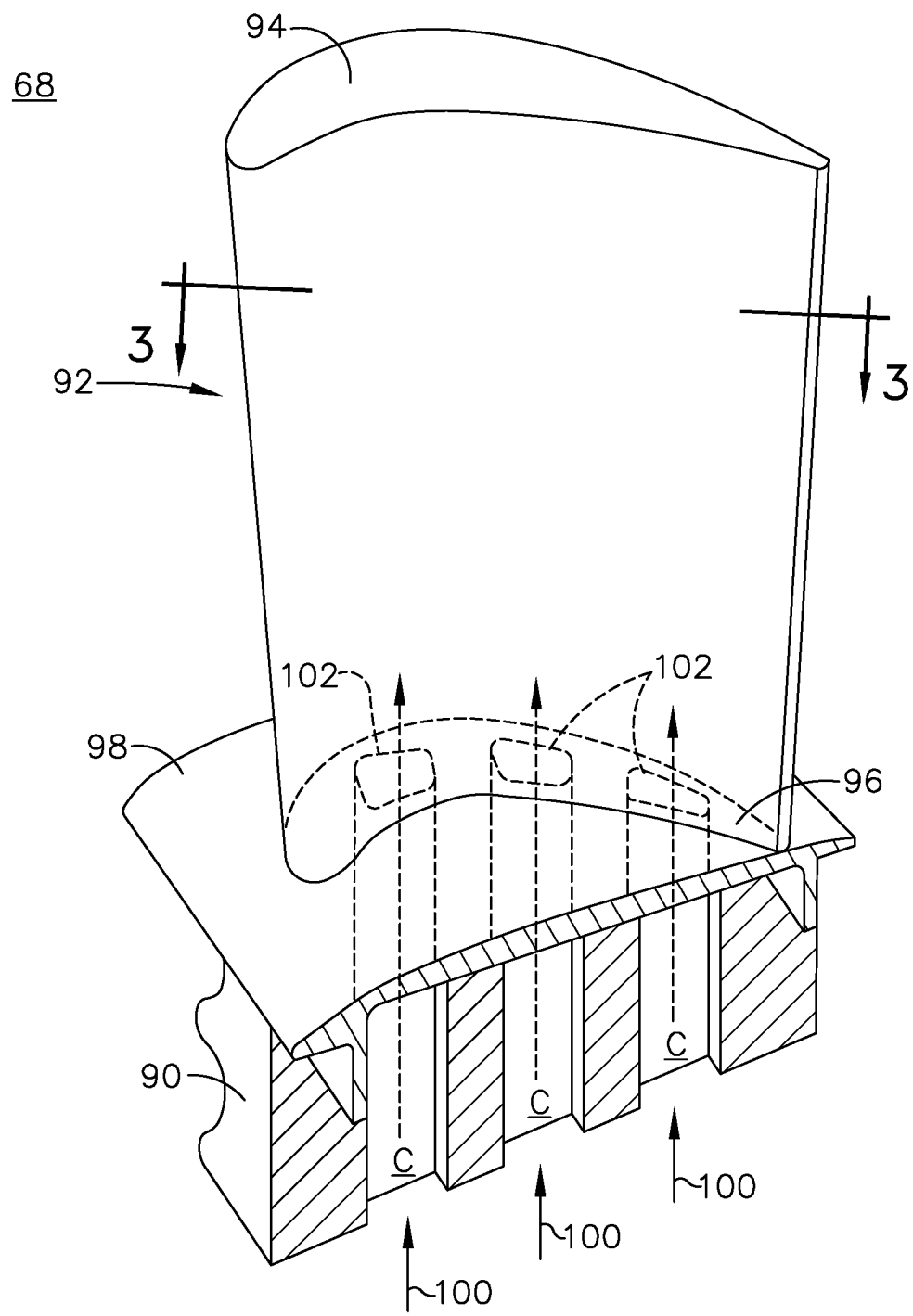
FIG. 2 is a perspective view of a blade provided in the gas turbine engine of FIG. 1.

FIG. 2 is a perspective view of an engine component in the form of one of the turbine blades 68 of the engine 10 from FIG. 1. The turbine blade 68 includes a dovetail 90 and an airfoil 92. The airfoil 92 includes a tip 94 and a root 96 defining a span-wise direction therebetween. The airfoil 92 mounts to the dovetail 90 at a platform 98 at the root 96. The platform 98 helps to radially contain the turbine engine mainstream airflow. The dovetail 90 can be configured to mount to a turbine rotor disk 71 on the engine 10 (FIG. 1). The dovetail 90 further includes at least one inlet passage 100, exemplarily shown as a three inlet passages 100, each extending through the dovetail 90 to provide internal fluid communication with the airfoil 92 at a passage outlet 102. It should be appreciated that the dovetail 90 is shown in cross-section, such that the inlet passages 100 are housed within the body of the dovetail 90. A flow of cooling fluid C can be provided to the airfoil 92 through the inlet passages 100. The flow of cooling fluid C can be used to cool portions of the airfoil 92 operating under heightened temperatures.

Figure 3:
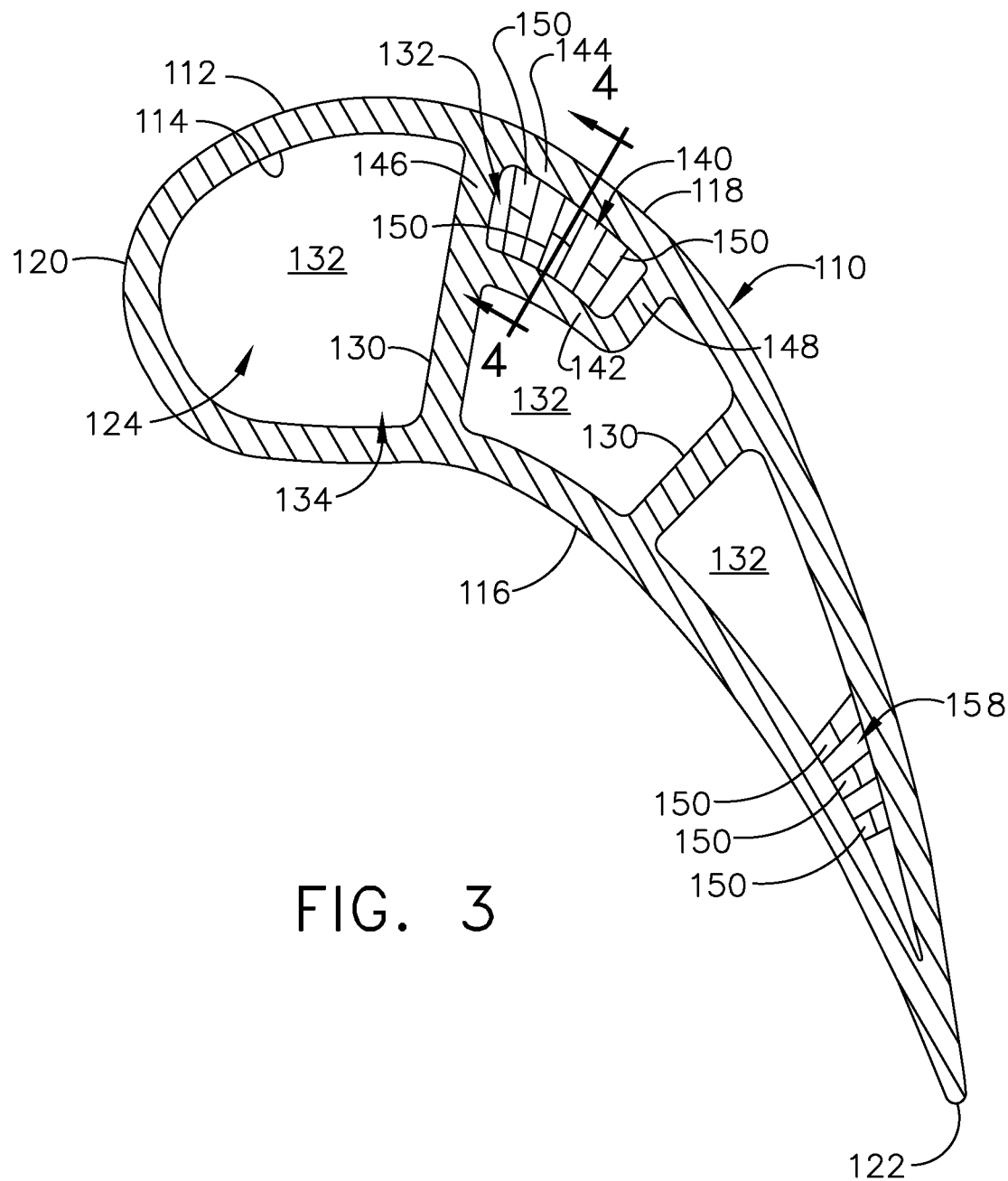
FIG. 3 is a cross-sectional view of the blade of FIG. 2 taken across-section 3-3 and illustrating turbulators organized in a pin bank provided in the blade.

Turning to FIG. 3, the airfoil 92 includes an outer wall 110 having a first surface 112 and a second surface 114. The first surface 112 can be an exterior surface of the airfoil 92 confronting a hot airflow and the second surface 114 can be an interior surface of the airfoil 92 confronting a cooling airflow, such as the flow of cooling fluid C of FIG. 2. The outer wall 110 further defines a concave-shaped pressure sidewall 116 and a convex-shaped suction sidewall 118 which are joined together to define an airfoil shape with a leading edge 120 and a trailing edge 122, defining a chord-wise direction therebetween. The airfoil 92 has an interior 124 enclosed by the outer wall 110. In operation, the blade 68 rotates in a direction such that the pressure sidewall 116 follows the suction sidewall 118. Thus, as shown in FIG. 3, the airfoil 92 would rotate upward toward the top of the page and somewhat into the page.

One or more ribs 130 can divide the interior 124 into multiple cooling passages 132. The cooling passages 132 can extend at least partially through the airfoil 92 in a substantially span-wise direction. It should be understood that the cooling passage 132 and the particular interior 124 of the airfoil 92 is exemplary and for purposes of understanding only. The cooling passages 132 can include additional elements, such as passages, channels, circuits, pin banks, turbulators, sub-circuits, plenums, near-wall cooling circuits, or similar. The cooling passages 132 and any such additional elements can form a cooling circuit 134 within the interior 124 of the airfoil 92.

In a non-limiting embodiment, the interior 124 can include a set of one or more turbulators arranged as an exemplary pin bank 140. While any position is contemplated, the pin bank 140 can be provided adjacent the trailing edge 122 extending between the suction sidewall 118 of the outer wall 110. The pin bank 140 can include a first sidewall 142 and a second sidewall 144, with the second sidewall 144 formed as a portion of the outer wall 110. It should be appreciated that the outer wall 110 need not form a portion of the pin bank 140 or either of the sidewalls 142, 144 of the pin bank 140. In such an example, the pin bank 140 can be formed by sidewalls 142, 144 housed entirely within the interior 124 of the airfoil 92. The first and second sidewalls 142, 144 can connect by a first endwall 146 and a second endwall 148 to define the pin bank 140 as a cooling passage 132 extending in the span-wise direction through the airfoil 92. As shown, the first endwall 146 is formed as part of one rib 130, while it is further contemplated that the first endwall 146 can be formed independent of any other interior or exterior structure or wall. The one or more turbulators, illustrated as exemplary chevron pins 150 in a pin bank 140, extend between the first and second sidewalls 142, 144. The pin bank 140 can at least partially form the cooling passage 132 between the sidewalls 142, 144 and the end walls 146, 148, or can be formed as part of the cooling passage 132 defined by the ribs 130. Regardless, it should be appreciated that the pin bank 140 is provided in a cooling passage 132 formed as a portion of the cooling circuit 134 through the airfoil 92.

In one additional example, a pin bank 158 can be provided adjacent the trailing edge 122, with pins 150 extending between the pressure sidewall 116 and the suction sidewall 118. It should be understood that any pin bank as described herein can be provided in any position within the airfoil 92, in any arrangement between any walls forming a cooling passage. Furthermore, it should be appreciated that multiple set of pin banks are contemplated.

It should be understood that the locations, number, and orientations of the cooling passages 132, the pin bank 140, and the chevron pins 150 should not be limited as shown. Additionally, while FIGS. 3 and 4 will be described in reference to chevron pins 150 as turbulators, it should be appreciated that the turbulators can include any shape extending between the first and second sidewalls 142, 144. The airfoil 92 of FIG. 3 is by way of example only to facilitate understanding of the aspects described herein. The number, organization, geometry, position, or otherwise of the cooling passages 132, cooling circuit 134, pin bank 140, or chevron pins 150 can vary in any manner such that a flow of cooling fluid can be provided through the cooling passage 132 of the cooling circuit 134 extending through the airfoil 92, with the pin bank 140 provided in the cooling passage 132 with at least one chevron pin 150 provided in the pin bank 140.

Additionally, it should be appreciated that the aspects of the airfoil 92 can have equal applicability to any engine component utilizing pin bank cooling. Non-limiting examples of such components can include a vane, nozzle, shroud, or combustion liner. The outer wall 110 can be a wall of such an engine component for separating a hot airflow from a cooling airflow at the first and second surfaces 112, 114 respectively, for example. A cooling passage having opposing sidewalls can extend through such an engine component defining at least a portion of a cooling circuit for providing the cooling airflow through the component, and including a set of pins to form a pin bank in the cooling passage. At least one chevron pin can be included in the set of pins of the pin bank provided in the cooling passage of the engine component.

Figure 4:
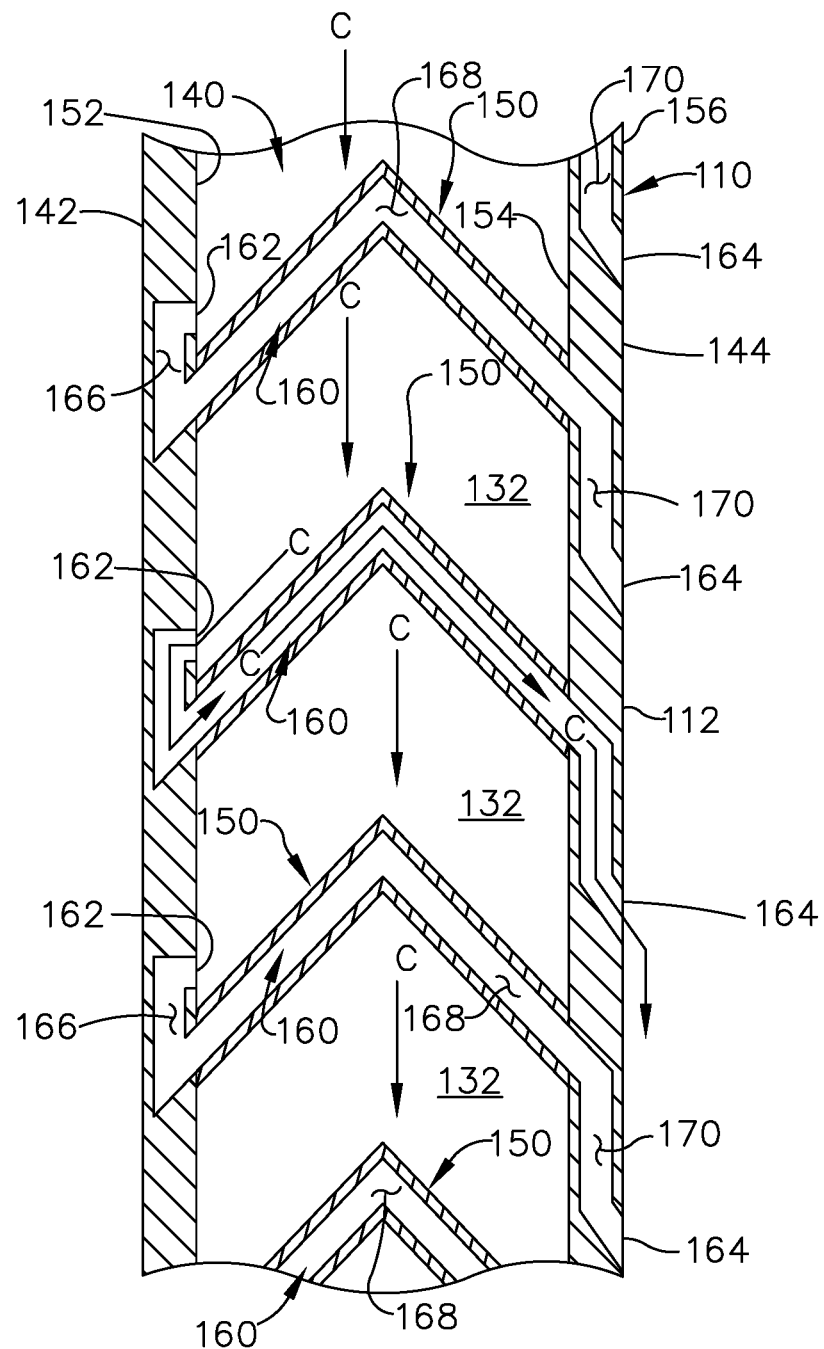
FIG. 4 is a cross-sectional view of the pin bank of FIG. 3 taken across section 4-4 illustrating the turbulators as chevron-shaped pins including a conduit extending through the pins.

Referring now to FIG. 4, the pin bank 140 includes the set of chevron pins 150 in an organized arrangement extending between the first sidewall 142 and the second sidewalls 144. The first sidewall 142 includes an inner surface 152 facing the pin bank 140. The second sidewall 144, formed as the outer wall 110, includes an inner surface 154 and an outer surface 156. In the exemplary pin bank 140, the outer surface 156 of the second sidewall 144 is also the first surface 112 of the outer wall 110 of FIG. 3 at the exterior of the airfoil 92.

A conduit 160 extends through the chevron pins 150. An inlet 162 of the conduit 160 is provided on the inner surface 152 of the first sidewall 142 and an outlet 164 of the conduit 160 is provided on the outer surface 156 of the second sidewall 144. While the inlet 162 is shown positioned at a right angle, it should be understood that the inlet extending to the conduit 160 can be arranged at an angle in order to facilitate a flow of fluid entering the conduit 160 at the inlet 162. Furthermore, while only one inlet 162 and one outlet 164, are shown, any number of inlets 162 or outlets 164 are contemplated. The inlet 162 is provided upstream of the chevron pin 150, relative to a flow of cooling fluid C through the cooling passage 132. While illustrated as having a conduit 160 extending through each chevron pin 150, it should be appreciated that only one, or any number of chevron pins 150 can include conduits 160 extending through them. As such, the conduit 160 can form a hollow pin or a partially hollow pin. The conduit 160 includes a first wall portion 166 extending through the first sidewall 142, a pin portion 168 extending through the chevron pin 150, and a second wall portion 170 extending through the second sidewall 144. The first wall portion 166 fluidly couples the inlet 162 to the pin portion 168 within the chevron pin 150. Additionally, the inlet 162 can be located anywhere in the pin 150. The second wall portion 170 fluidly couples pin portion 168 to the outlet 164. The outlet 164 formed on the outer wall 110 can be a film hole, located in the outer wall 110, in one non-limiting example. It is further contemplated that there can be multiple outlets 164, including a film hole outlet. Additionally, it is contemplated that there can be more than one inlet 162.

In one alternative example, the outlet 164 from an upstream conduit 160 can form the inlet 162 for a downstream conduit 160. As such, a crisscross pattern can be formed guiding the flow of cooling fluid C back and forth between the first and second sidewalls 142, 144. Similarly, the inlet 162 from a downstream conduit 160 can be formed at the outlet 164 of an upstream conduit 160.

In operation, as shown in FIG. 4, a flow of cooling fluid C can pass through the cooling circuit 134 within the cooling passage 132 along the pin bank 140. At least a portion of the flow of cooling fluid C can pass into the conduits 160 at the inlet 162. The flow of cooling fluid C can pass through the pin portion 168 to the second wall portion 170. The flow of cooling fluid C can be exhausted at the outlet 164. In one non-limiting example, the outlet 164 can be formed as a film hole and the exhausted flow of cooling fluid C can form a cooling film along the first surface 112 of the outer wall 110. It should be appreciated that it is contemplated that the inlet 162 can be positioned anywhere along the cooling circuit 134 or within the airfoil 92, such that the flow of cooling fluid C can pass through a conduit 160 through and exhaust at any position interior or exterior of the airfoil 92. Stated in another way, the organization as shown is exemplary, as long as at least one cooling pin is hollow.

It should be further appreciated that the aspects as described herein provide for improved cooling within an engine component, such as the airfoil 92. The pins 150 can have improved cooling effectiveness as the flow of cooling fluid C passing through the pins 150 reduces the temperature of the pins and results in a greater temperature differential, producing a greater heat transfer rate, between the pins and a flow passing across the pins 150, which provides for more heat extracted from the flow. The increased surface area of the conduit 160 contacting the flow of cooling improves overall cooling of the component. Additionally, the flow extracted through the conduit 160 can be released as a film through a micro-channel as the outlet of the conduit 160. Similarly, the pins, particularly when organized as the pin bank 140, can maintain structural integrity for the engine component, while improving cooling effectiveness.

Furthermore, the aspects can provide for improved component lifetime while minimizing required maintenance. Additionally, hollow cooling pins reduce the overall weight of the component, which can provide an improvement in overall engine efficiency.

A method of cooling an engine component can include redirecting a portion of a cooling fluid passing through a cooling passage within the engine component through the interior of a turbulator spanning the cooling passage. The pin, in one non-limiting example, can be the chevron-shaped pin as described herein, or can be any suitable shape or geometric orientation or any other pin as described herein. The conduit can extend at least partially through the pin, such that at least a portion of the pin can be hollow, with the walls having any thickness. The sidewalls can be the sidewalls as described in FIG. 4, or can be any sidewalls between which a pin extends. Such sidewalls may or may not include an exterior wall of the engine component.

The method can further include redirecting the portion of the cooling fluid back into the cooling passage. For example, an outlet for the interior can be formed on the cooling passage and the portion of air passing through the interior of the turbulator can be redirected back into the cooling passage.

The method can further include exhausting the flow of cooling fluid through an outlet one an exterior of the engine component to form a cooling film along the engine component. The interior can be used to direct a volume of the cooling fluid to the exterior of the component and the outlet can be formed as a film hole to form a layer of cooling film along the exterior of the component.

The method can further include feeding the flow of cooling fluid to the conduit at an inlet provided along one of the opposing sidewalls and upstream of the pin relative to the flow of cooling fluid. The inlet can further be provided along an interior sidewall, or a sidewall that is not common with an outer wall of the engine component.

The method can further include exhausting the flow of cooling fluid through an outlet. The outlet can be positioned on an exterior of the engine component. The outlet can exhaust the flow of cooling fluid as a cooling film along the engine component.

Figure 5:
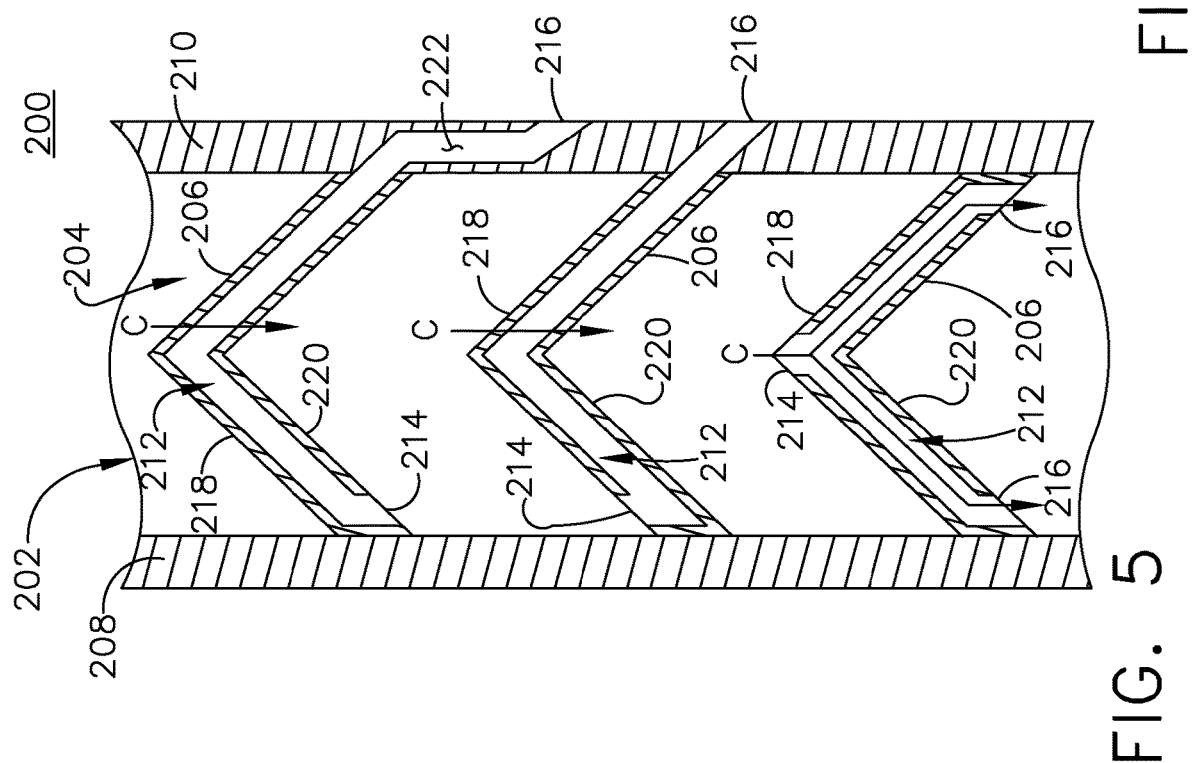
FIG. 5 is an alternative pin bank including linear pins having different positions for inlets for a conduit extending through the pins.

Referring now to FIG. 5, an alternative cross section of an engine component 200, having a cooling circuit 202 with a cooling passage 204 can include at least one chevron-shaped pin 206 extending between two opposing sidewalls 208, 210. A first sidewall 208 can be an interior wall, while a second sidewall 210 can be an exterior sidewall, such as an outer wall for the engine component 200. A conduit 212 can extend at least partially through the pins 206, such that at least a portion of the pins 206 are hollow. The conduits 212 can have an inlet 214 and an outlet 216. The inlet 214 can be positioned anywhere along the pin 206, such as along an upstream wall 218 or along a downstream wall 220 relative to a direction of a flow of cooling fluid C through the engine component 200, in non-limiting examples. Additionally, the inlet 214 is shown as positioned at the junction or tip of the chevron-shaped pin 206, having outlets provided on both legs.

The outlet 216 can be positioned on the exterior of the engine component 200, such that an exhausted flow of fluid forms a cooling film along the component. The conduit 212 can include a wall passage 222 at least partially extending through the second sidewall 210, such as a near-wall cooling passage in one non-limiting example. The wall passage 222 can provide for providing additional cooling along a portion of the sidewall 210 prior to exhausting the flow of cooling fluid C. While shown on the second sidewall 210, it should be understood that the wall passage 222 can be in any sidewall 208, 210, and can extend for any length as may be desirable.

Figure 6:
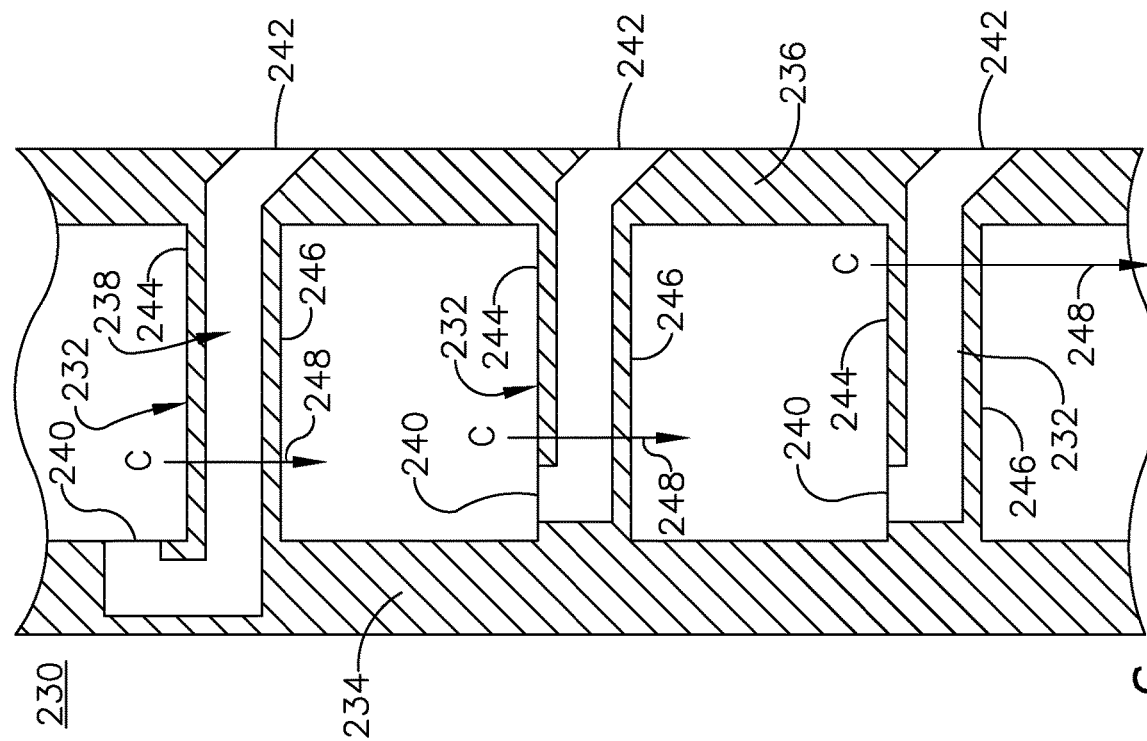
FIG. 6 is another alternative pin bank including chevron-shaped pins having different positions for inlets for a conduit extending through the pins.

Referring now to FIG. 6, another exemplary engine component 230 is shown having a set of pins 232 extending between two sidewalls 234, 236. The pins 232 can be linear as shown, or can have any shape, geometry or orientation, as well as any cross-sectional shape, such as circular in one non-limiting example. A conduit 238 can at least partially extend through the pins 232 such that at least a portion of the pins 232 are hollow. The conduit 238 can include an inlet 240 and an outlet 242. The inlet 240 can be positioned on one of the sidewalls 234, 236, or alternatively can be positioned on the linear pins 232, such as along an upstream surface 244 or a downstream surface 246 relative to a flow direction through a cooling passage 248 defined by the sidewalls 234, 236.

Figure 7:
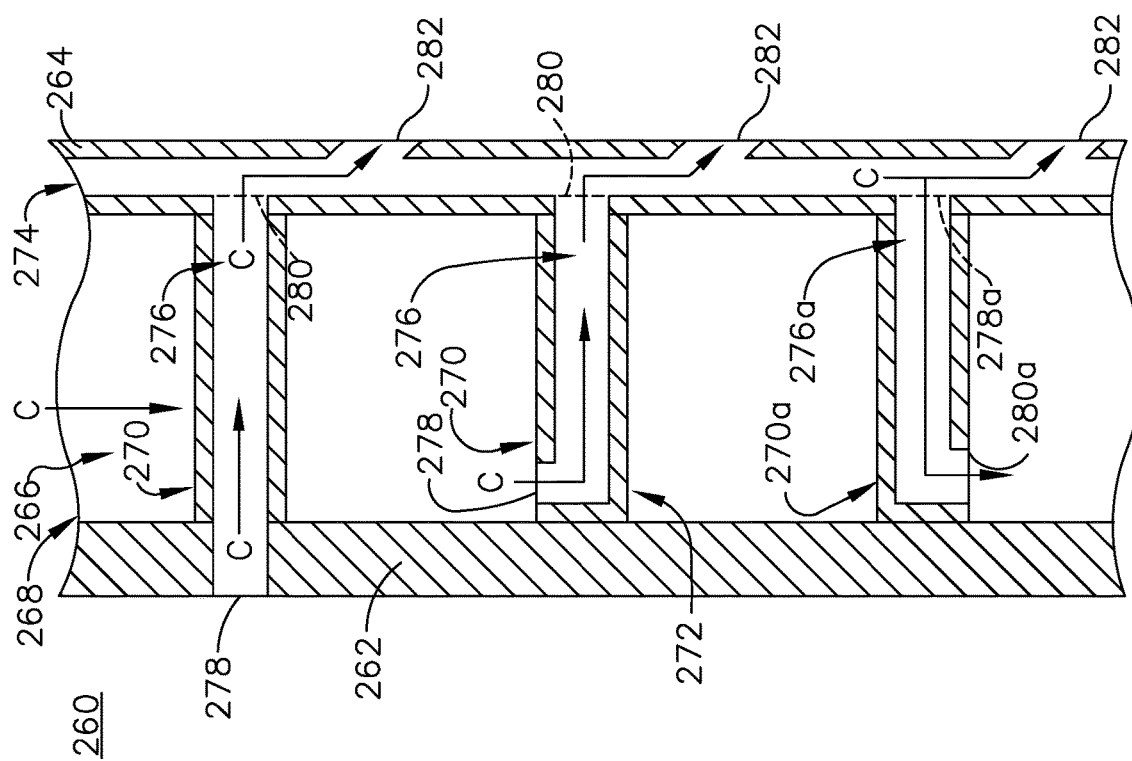
FIG. 7 is another alternative pin bank including conduits fluidly coupled to a near-wall cooling passage.

Referring now to FIG. 7, another exemplary engine component 260 can include two opposing sidewalls 262, 264 defining a cooling passage 266 and at least partially defining a cooling circuit 268. A set of pins 270, which can form a pin bank 272, extend between the opposing sidewalls 262, 264. An alternative cooling passage 274, such as a near wall cooling passage in one non-limiting example, can extend through one of the opposing sidewalls 262, 264. A conduit 276 can extend at least partially through the pins 270, including an inlet 278 and an outlet 280. It should be appreciated in FIG. 7 that the differing positions of the inlets 278 and the outlets 280 are illustrative of different organizations for the pins 270, as well as being determinative of flow direction through the conduits 276. The outlet 280 can be provided at the alternative cooling passage 274, for example. The alternative cooling passage 274 can be common to multiple conduits 276 extending through multiple pins 270. Additionally, it is contemplated that the alternative cooling passage 274 may only be in communication with some conduits 276 or organized into sets or groups, with dedicated alternative cooling passages 274 for each set or group. An exhaust hole 282, such as a film hole, can provide for exhausting the flow of cooling fluid within the alternative cooling passage 274. The alternative cooling passage 274 can improve wall cooling, and minimize the required cooling film to maintain operational temperatures for the engine component.

Alternatively, it is contemplated that one or more conduits 276a can have an inlet 278a provided at the alternative cooling passage 274 and an outlet 280a provided along the pin 270a.

Figure 8:
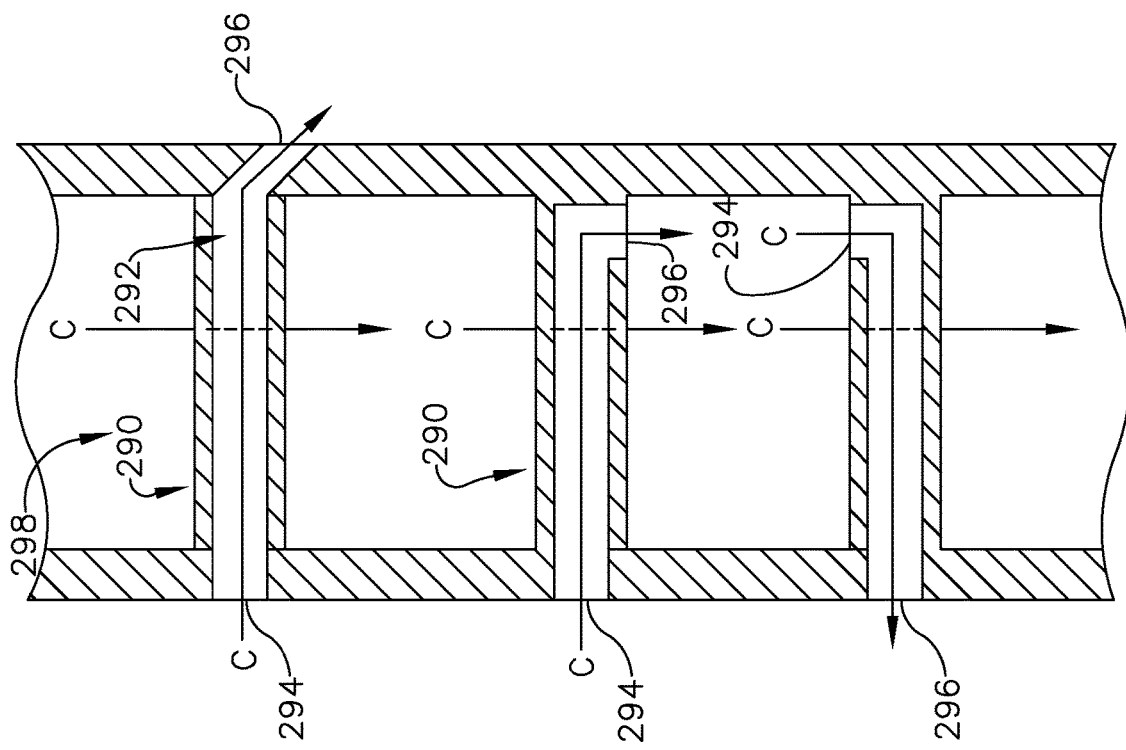
FIG. 8 is another alternative pin bank including conduits fluidly fed from a cooling passage different from a cooling passage in which the pin bank is formed.

Referring now to FIG. 8, one or more pins 290 can include conduits 292 having inlets 294 that are fed from the exterior of a cooling passage 298 in which the pins 290 are provided. The exterior can include an adjacent cooling passage, for example, or any other structure of an engine component, as well as the exterior of the engine component. The conduits 292 can have an outlet 296 on the pins 290 or to the exterior of the cooling passage 298 in which the pins 290 are provided. The differing positions of the inlet 294 and the outlets 296 are illustrative of determining a flow path or flow direction through the conduits 292.

Figure 9:
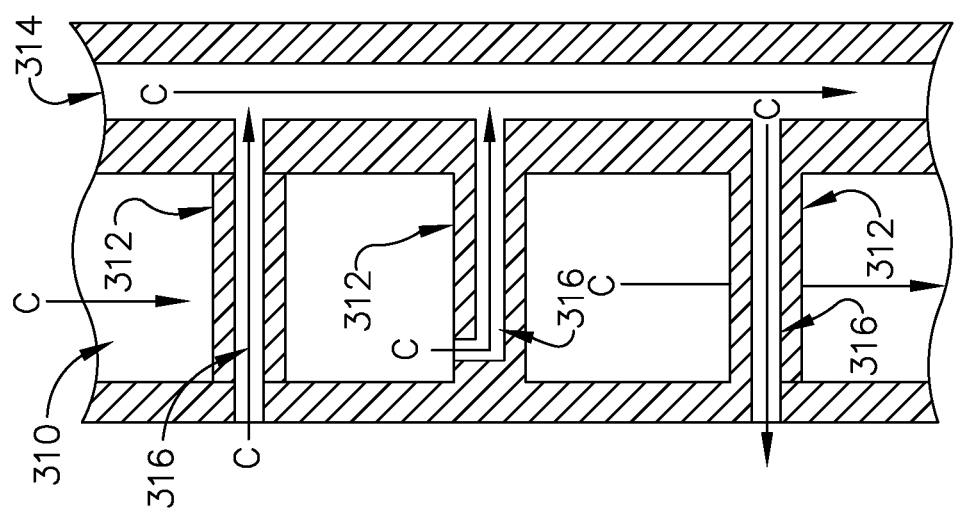
FIG. 9 is another alternative pin bank having pins fluidly exhausting to a cooling passage different from a cooling passage in which the pin bank is formed.

Referring now to FIG. 9, a cooling passage 310 including one or more pins 312 can fluidly exhaust to an adjacent cooling passage 314. While the adjacent cooling passage 314 is illustrated as a narrow cooling passage, as compared to the cooling passage 310 or a near wall cooling passage, it should be appreciated that the conduits 316 extending through the pins 312 can exhaust to another cooling passage 314 or another portion of the engine component, and need not exhaust to the exterior of the engine component. The cooling passage 314 can be any passage, and need not be thin or a near wall cooling passage.

Figure 10:
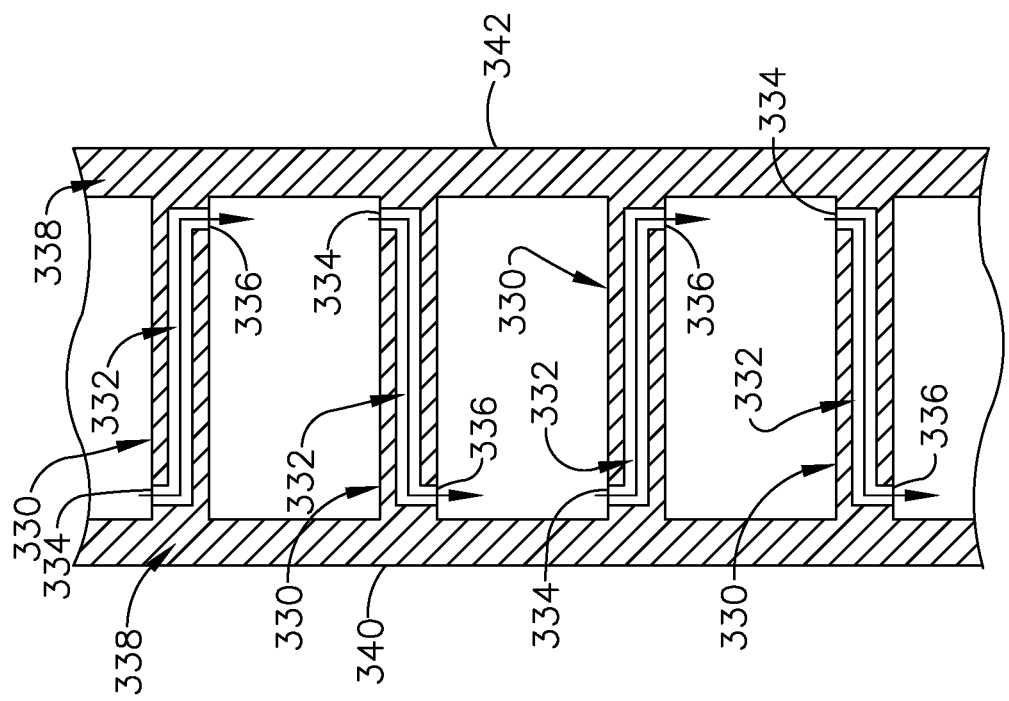
FIG. 10 is another alternative pin bank having pins with conduits organized in an alternating, offset pattern.

Referring now to FIG. 10, a set of pins 330 can include interior conduits 332 having an inlet 334 and an outlet 336. The pins 330 can extend between two opposing sidewalls 338, as a first sidewall 340 and a second sidewall 342 opposite the first sidewall 340. The inlets 334 and outlets 336 can be positioned next to adjacent opposing sidewalls 338. The inlets 334 and the outlets 336 can be organized in an alternative manner, such that the inlets 334 and the outlets 336 among adjacent pins alternate between adjacent a first sidewall 340 and a second sidewall 342. The alternating organization of the inlets 334 and the outlets 336 can provide for an improved temperature distribution through the cooling passage 314, where one side may otherwise have a greater temperature adjacent to a hotter area of the engine component.

Figure 11:
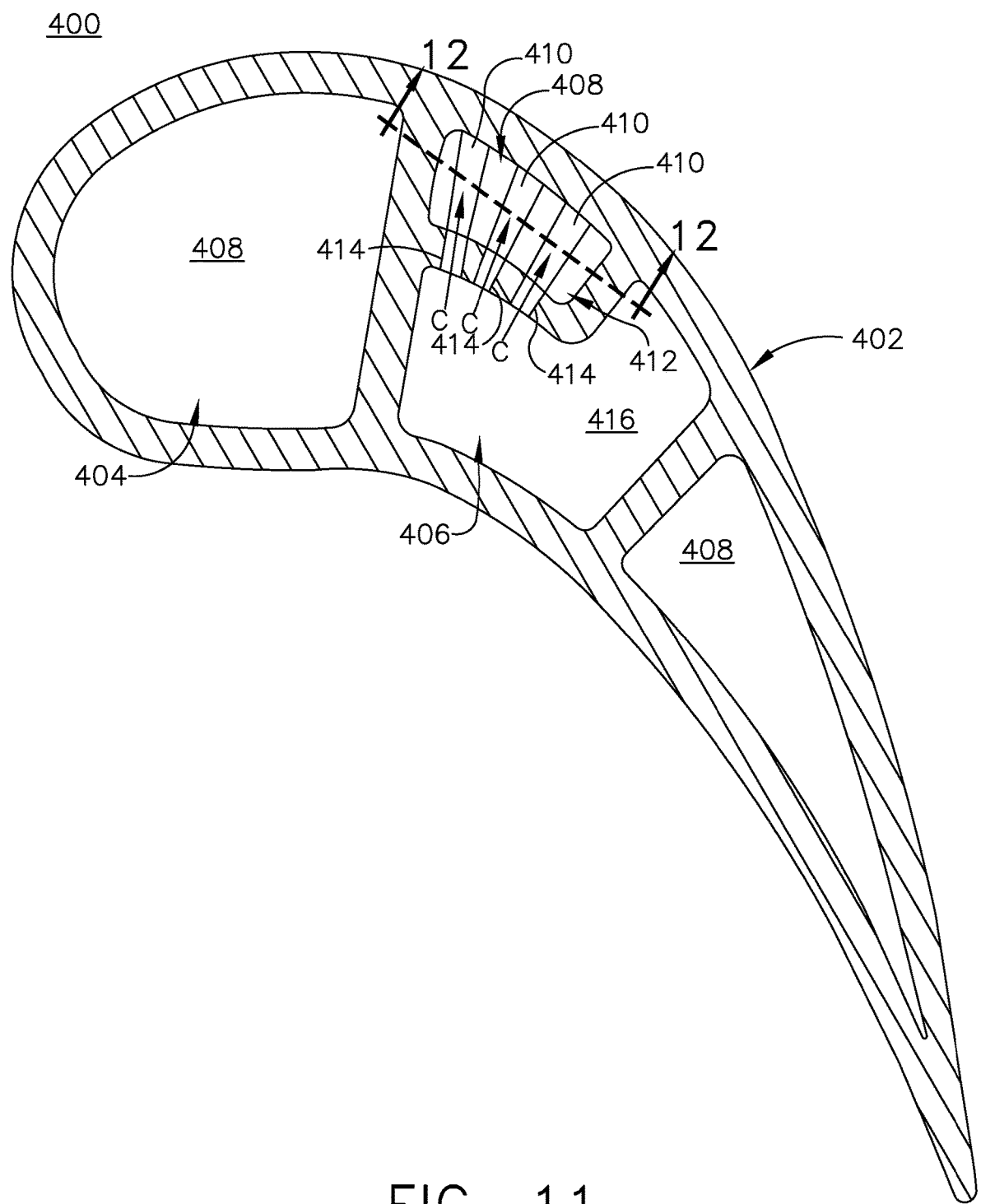
FIG. 11 is a cross-sectional view of another exemplary blade showing a pin bank fed from an adjacent cooling passage.

Referring now to FIG. 11, an alternative engine component illustrated in the form of an airfoil 400 includes an outer wall 402 housing an interior 404. A cooling circuit 406 can extend through the interior 404, including one or more cooling passage 408. One cooling passage 408 can include a set of pins 410, which can be organized as a pin bank 412 being an organized set of multiple pins 410 extending through the cooling passage 408. A flow of cooling fluid C can be provided through a set of wall apertures 414 to the pins 410 from an adjacent cooling passage 416. Additionally, it is contemplated that a pin bank can be provided adjacent the trailing edge of the engine component, similar to that of FIG. 3.

Figure 12:
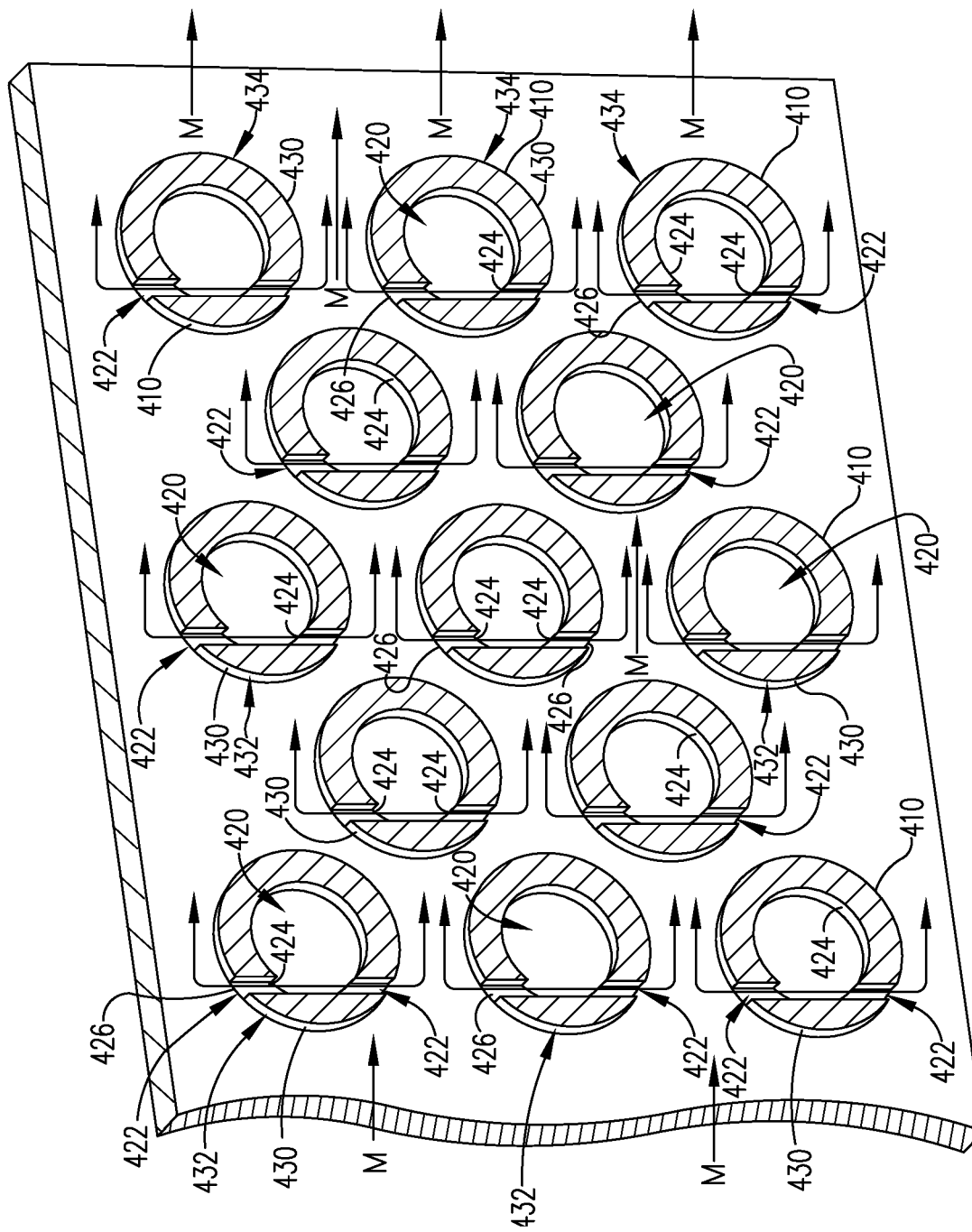
FIG. 12 is a cross-sectional view of the pin bank of FIG. 11, showing conduits with two outlets formed on the pins, fed from the interior of the pins.

Referring now to FIG. 12, taken across section 12-12 of FIG. 11, the pins 410 are hollow to define an interior chamber 420. The interior chamber 420 can be fed with the flow of cooling fluid C from the aperture 414 of FIG. 11 coupling the pins 410 to the adjacent cooling passage 416. A set of exhaust conduits 422 can be provided in the pins 410, while it is contemplated that any number of exhaust conduits 422 are provided in the pins 410, in any organization. The exhaust conduits 422 can include an inlet 424 and an outlet 426, with the inlet 424 provided on an interior surface 428 of the pin 410 at the interior chamber 420, and the outlet 426 provided on an exterior surface 430 of the pin 410.

The pins 410 include an upstream side 432 and a downstream side 434, relative to a mainstream flow of fluid M through the cooling passage 408. The outlet 426 of the exhaust conduits 422 is positioned on the upstream side 432 of the pins 410, while any position is contemplated. The two exhaust conduits 422 in each pin 410 are arranged on opposing sides of the pin 410. As such, about half of the flow of cooling fluid C can exhaust toward one side of the pin 410 and about the remaining half of the flow of cooling fluid C can exhaust toward the opposite side. The exhausted flow of cooling fluid C from the pins 410 is carried with the mainstream flow of fluid M through the pin bank 412. The pins 410 can be arranged in an offset manner, such that the flow of cooling fluid C exhausted from the pins 410 impinges upon a downstream pin 410, which can improve turbulence and increase local heat transfer coefficients.

It should further be appreciated that the hollow pins as described in FIGS. 11 and 12 can be combined with the conduits as described herein, such that a flow of fluid may be provided to one or more pins in the manner of FIGS. 11 and 12, and can be provided through other pins in any of the manners described in FIGS. 4-10.

The engine components, as well as the features of the pins as described herein, can be made, formed, or manufactured by additive manufacturing, such as 3D printing in non-limiting examples. The complex details of the hollow pins, or the conduits extending through the pins and the surrounding structure may be difficult costly to manufacture using traditional methods, which may require excessive costs, or result in poor product yields, particularly in aviation applications. However, using additive manufacturing provides for consistent manufacture of the complex geometry of the pins as described herein.

It should be appreciated that application of the disclosed design is not limited to turbine engines with fan and booster sections, but is applicable to turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
    an outer wall defining a pressure side and a suction side extending axially between a leading edge and a trailing edge defining a chord-wise direction and extending radially between a root and a tip defining a span-wise direction;
    a cooling circuit located within the airfoil and comprising a cooling passage including a first sidewall having a first surface along the cooling passage and a second sidewall having a second surface along the cooling passage, with a flow of cooling fluid passing along the cooling passage; and
    a turbulator provided in the cooling passage extending between the first surface and the second surface; and
    a conduit having an inlet and an outlet, the conduit fluidly coupled to the cooling circuit, and the conduit at least partially passing through the turbulator;
    wherein the inlet is provided on the first surface wholly upstream of the turbulator where the turbulator meets the first sidewall, relative to the flow of cooling fluid passing along the cooling passage.

2. The airfoil of claim 1 wherein the turbulator is one of a plurality of turbulators.

3. The airfoil of claim 2 wherein a plurality of conduits, including the conduit as one of the plurality of conduits, is provided such that each turbulator of the plurality of turbulators includes a complementary conduit from the plurality of conduits.

4. The airfoil of claim 1 wherein the outlet is provided on one of an upstream surface or a downstream surface of the turbulator, or on one of the first or second sidewalls.

5. The airfoil of claim 1 further comprising a film hole provided in the outer wall and fluidly coupled to the cooling passage wherein the film hole forms the outlet.

6. The airfoil of claim 1
    wherein the outlet is located on the second sidewall and downstream of the turbulator; and
    wherein the conduit extends from the inlet, through the first sidewall, through the turbulator, through the second sidewall, and to the outlet.

7. The airfoil of claim 1 wherein the outer wall forms the second sidewall, and the outlet is provided on the outer wall.

8. The airfoil of claim 1 wherein the turbulator is formed as a pin having a chevron shape.

9. The airfoil of claim 1 further comprising a near wall cooling passage formed in the second sidewall.

10. The airfoil of claim 9 wherein the outlet is provided at the near wall cooling passage.

11. The airfoil of claim 9 further comprising at least one film hole fluidly coupled to the near wall cooling passage.

12. The airfoil of claim 9 further comprising at least one additional turbulator with an additional conduit extending through the at least one additional turbulator, with the inlet of the additional conduit provided at the near wall cooling passage.

13. The airfoil of claim 9 wherein the at least one additional turbulator further includes the outlet provided on the turbulator.

14. The airfoil of claim 1 wherein the turbulator includes a plurality of turbulators and the conduit includes a plurality of conduits; and
    wherein the outlets are provided on a downstream surface of the plurality of turbulators.

15. The airfoil of claim 1 wherein the outlet is formed as a first exhaust conduit and a second exhaust conduit on an upstream surface the turbulator.

16. The airfoil of claim 1 wherein the turbulator is a chevron pin.

17. A component for a turbine engine, the component comprising;
    an outer wall separating a cooling airflow from a hot airflow having a first surface facing the cooling airflow and a second surface facing the hot airflow;
    a cooling circuit is at least partially defined by the outer wall and includes at least one cooling passage, with the cooling passage having a first sidewall with a first surface and a second sidewall with a second surface along the cooling passage spaced from the first surface;
    at least one pin provided in the cooling passage extending between the first surface and the second surface; and
    at least one conduit in fluid communication with the cooling circuit having an inlet and an outlet, and the at least one conduit at least partially passing through the at least one pin;
    wherein the inlet of the at least one conduit is provided on the at least one pin and wherein the outlet is provided on one of the first surface or the second surface.

18. The component of claim 17 wherein the at least one pin is a chevron pin.

19. The component of claim 17 wherein outer wall forms the second sidewall, and the outlet forms a film hole on the outer wall.

20. The component of claim 17 further comprising a near wall cooling passage formed within the second sidewall.

21. The component of claim 20 wherein the outlet is provided on the second sidewall at the near wall cooling passage.

22. The component of claim 21 wherein the outlet is formed as a film hole.

23. The component of claim 20 further comprising a second pin, in addition to the at least one pin, including a second conduit in addition to the at least one conduit, wherein the second pin includes an inlet at the near wall cooling passage.

24. The component of claim 23 wherein the second conduit of the second pin includes an outlet on the second pin.

25. The component of claim 24 wherein the outlet on the second pin is on a downstream side of the second pin.

26. An airfoil for a turbine engine, the airfoil comprising:
an outer wall defining a pressure side and a suction side extending axially between a leading edge and a trailing edge defining a chord-wise direction and extending radially between a root and a tip defining a span-wise direction;
a cooling circuit located within the airfoil and comprising at least one cooling passage including a first sidewall and a second sidewall;
a plurality of turbulators provided in the at least one cooling passage extending between the first sidewall and the second sidewall; and
a plurality of conduits, with each conduit of the plurality of conduits having an inlet and an outlet and being fluidly coupled to the cooling circuit, and each conduit of the plurality of conduits at least partially passing through one turbulator of the plurality of turbulators;
wherein the inlets of the plurality of conduits are provided on an upstream surface of the plurality of turbulators, and the outlets of the plurality conduits are provided on a downstream surface of the plurality of turbulators;
wherein the inlet for each conduit of the plurality of conduits are provided adjacent to one of the first sidewall or the second sidewall, and the outlet for each conduit of the plurality of conduits are provided adjacent to the other of the first sidewall or the second sidewall than that of the inlet; and
wherein the plurality of turbulators include a first turbulator with the inlet adjacent the first sidewall and the outlet adjacent the second sidewall, and a second turbulator adjacent the first turbulator, with the inlet adjacent the second sidewall and the outlet adjacent the first sidewall.

27. The airfoil of claim 26 wherein the first turbulator is adjacent the second turbulator by the first turbulator being near and spaced from the second turbulator.

28. The airfoil of claim 27 wherein a cooling fluid exhausting from the outlet of an upstream conduit passes to the at least one cooling passage before the cooling fluid passes to the inlet of a downstream turbulator.

* * * * *